United States Patent [19]

Damon

[11] Patent Number: 4,944,601

[45] Date of Patent: Jul. 31, 1990

[54] DAMON SYRUP RECOVERY SYSTEM

[76] Inventor: Kenneth Damon, R.F.D. #1, Box 610, Poland, Me. 04273

[21] Appl. No.: 476,712

[22] Filed: Feb. 8, 1990

[51] Int. Cl.[5] .......................... B01F 15/02; A23L 2/40

[52] U.S. Cl. .................................. 366/160; 99/323.2; 261/DIG. 7; 426/477; 366/162; 366/177

[58] Field of Search ........ 366/131, 132, 134, 151-153, 366/160, 162, 177; 99/323.2, 483, 275, 323.1; 261/60, 153, DIG. 7; 426/477, 590, 475

[56] References Cited

U.S. PATENT DOCUMENTS

| | | | |
|---|---|---|---|
| 3,960,066 | 6/1976 | LaRocco et al. | 99/323.2 |
| 4,051,034 | 9/1977 | Amon et al. | 261/DIG. 7 |
| 4,112,828 | 9/1978 | Mojonnier et al. | 99/275 |
| 4,242,841 | 1/1981 | Ushakov et al. | 366/160 |
| 4,531,456 | 7/1985 | Kemp, Jr. et al. | 261/153 |
| 4,669,889 | 6/1987 | Yamaguchi et al. | 366/177 |
| 4,708,827 | 11/1987 | McMillin | 99/323.1 |
| 4,717,515 | 1/1988 | Forsyth et al. | 366/107 |
| 4,737,037 | 4/1988 | Mojonnier | 366/162 |
| 4,742,939 | 5/1988 | Galockin | 366/137 |
| 4,857,355 | 8/1989 | Gregg | 426/477 |

*Primary Examiner*—Timothy F. Simone
*Attorney, Agent, or Firm*—Thomas L. Bohan

[57] ABSTRACT

An improvement system and apparatus designed to be affixed to a particular type of mixing/cooling/carbonation/bottling equipment comprising a duct for conveying residual fluid from a reservoir, an electronic override to bypass automatic circuitry of the mixing-/cooling/carbonation/bottling equipment, means to observe the conveyance of the residual fluid through the duct, and means to terminate the flow of the residual fluid though the duct. The invention is designed to utilize a venturi effect created at one interface of the duct and the mixing/cooling/carbonation/bottling equipment and to ensure appropriate water to fluid mixing proportions. The invention permits recovery of almost five gallons of residual fluid after every production run of the mixing/cooling/carbonation/bottling equipment and significantly reduces the introduction of a large quanity of sugar to a bottling plant's sewage system.

10 Claims, 2 Drawing Sheets

DAMON SYRUP RECOVERY SYSTEM

BACKGROUND OF THE INVENTION

1. Field of the Invention

This invention generally relates to the recovery of unused fluid in a mixing and bottling system. More particularly, this invention consists of a kit and process to be incorporated into a carbonation and cooling system with a fluid proportioning apparatus, for the recovery of beverage concentrate or syrup.

2. Description of Prior Art

The carbonated beverage bottling industry has long utilized large-scale automated machinery for (1) mixing basic syrup (beverage concentrate) and water in specific proportions, (2) cooling the mixture, (3) injecting carbon dioxide gas into the cooled mixture, and (4) apportioning the carbonated mixture among bottles and then capping those bottles as they pass by on a conveyor belt. A typical mixing/carbonation system is described in U.S. Pat. No. 4,531,456 issued to Kemp et al. It operates by proportionally mixing water and the beverage concentrate after which the mixture is introduced into a carbonation vessel. In the system of Kemp et al., which is the system predominately used within the industry, the mixing manifold wherein the water and syrup are mixed is positioned above separate reservoirs for the water and syrup, respectively. These fluids are then forced up through vertical conduits, sized to ensure proper mix proportions, into the mixing manifold. From the mixing manifold, the mixture is drawn by pump into the carbonation vessel.

In a typical operation at a large bottling plant, the type of syrup—i.e., the type of beverage being prepared—may be changed up to several times on a daily basis. A serious drawback of the apparatus presently used throughout the industry is the fact that at the end of each run, when the system is either shut down or switched to another type of beverage, approximately five gallons of syrup have to be dumped. That is, the residue located below the bottom opening of the veritcal conduit is lost to the system and has to be exhausted through a drain on the bottom extremity of the syrup reservoir. This dumping, in addition to inflicting an immediate and direct economic loss on the operator, imposes a significant—and occasionally unacceptably high—"biological oxygen demand" (BOD) on the waters into which the waste syrup ultimately finds its way. This environmentally-deleterious effect can itself have a direct economic impact on the operator, since municipal sewerage for an industrial operation is generally based on such things as the BOD per unit volume of discharge by a plant.

In the present apparatus the fluids to be mixed are transported into the mixing manifold through vertical conduit tubes which extend down into—but not to the bottom of—the respective reservoirs. The respective fluids are then forced up through the conduits by an overpressure on their surfaces exerted by a gas, typically carbon dioxide, introduced into the headspace of the respective reservoirs. During a production run, as syrup is removed from the syrup reservoir by this method, replacement syrup is continually introduced to the reservoir from a much larger supply source, the volume of which is established by the total product volume which the run in question is designed to generate. This ensures that the syrup level in the syrup reservoir does not fall below the bottom of the vertical conduit until the run is completed. More particularly, a liquid level probe is located within the reservoir so as to ensure that the syrup level remains within a desired operating range and in particular that it does not fall below the bottom of the vertical conduit. Whenever the syrup level falls below the preset minimum level the probe activates a pneumatic plunger which cuts off further flow of the syrup from the syrup reservoir into the mixing manifold. Thus, when the run has been completed and the supply of syrup flowing to the syrup reservoir has been exhausted, the flow of syrup into the mixing manifold is interrupted, leaving the syrup level in the reservoir at the bottom of the vertical conduit. In the present system, this residue of syrup is stranded since there is no way that it can be utilized by the mixing/cooling/carbonating/bottling process. The traditional means of dealing with this residue, which typically amounts to five gallons, has been to drain it out of the bottom of the reservoir and onto the floor, from where it goes into the bottling plant's sewage system, thereby introducing a large quantity of sugar and other oxidizable ingredients into that system. In a typical large bottling plant there will be five syrup changes per machine per day, resulting in the flushing of approximately twenty-five gallons of concentrated syrup each operating day.

The allowable BOD level in a bottling plant's outfall is generally regulated by state environmental protection agencies and municipal sewer districts. Maximum allowable levels vary, depending upon the size of the plant and regulations in the particular municipality. BOD levels above a certain threshold level result in annual surcharges over and above the fees normally paid by the bottler. These surcharges can run into the thousands of dollare annually. Furthermore, there are circumstances under which high BOD levels can result in a regulatory authority actually ordering the closing of a bottling plant. There are currently about 200 bottling plants throughout this country operating units which require the dumping of a significant quantity of residual syrup at the conclusion of each production run. All face the same two problems: product waste and excessive BOD levels, both resulting from the practicable inability to recover leftover syrup. In spite of these economic and environmental problems, there is little likelihood that equipment turnover will remedy the situation in the foreseeable future. This is because the presently-installed equipment is costly, relatively new, and quite desirable other ways.

What is needed, therefore, is a practicable syrup-residue recovery system that (1) captures the residual syrup and allows its utilization in the production process, and (2) is easily incorporated into the mixing/cooling/carbonation/bottling ("MCCB") apparatus currently in use throughout the industry.

SUMMARY OF THE INVENTION

The present invention comprises a plurality of elements designed to be affixed to the particular type of MCCB equipment presently used throughout the industry. It includes a duct for conveying residual fluid out of the bottom of a reservoir and from there up the line used for conveying fluid between the traditional mixing manifold and the pre-carbonation cooling chamber of the standard apparatus. In the invention, the residual syrup is forced up through this duct by the same technique used during the normal part of the production run to force it into the mixing chamber, namely overpressure with carbon dioxide introduced into the syrup reservoir. In order to permit the application of the carbon dioxide pressurization within the confines of the traditional system, the present invention includes an electrical means for defeating the level probe. Furthermore, within the duct connecting the bottom of the syrup reservoir to the traditional system downstream from the mixing chamber, there is a valve permitting the by-pass duct to be closed off during the conventional part of the production run. Since the technique of the present invention involves combining the water and the syrup at a location outside of the mixing chamber and since, furthermore, there is a significant venturi effect generated at the location where the syrup is introduced into the stream of water, the invention also includes means to adjust the syrup/water proportions so that the resulting mixture is appropriate for the beverage being produced for bottling.

PREFERRED EMBODIMENT OF THE INVENTION

Figure 1:
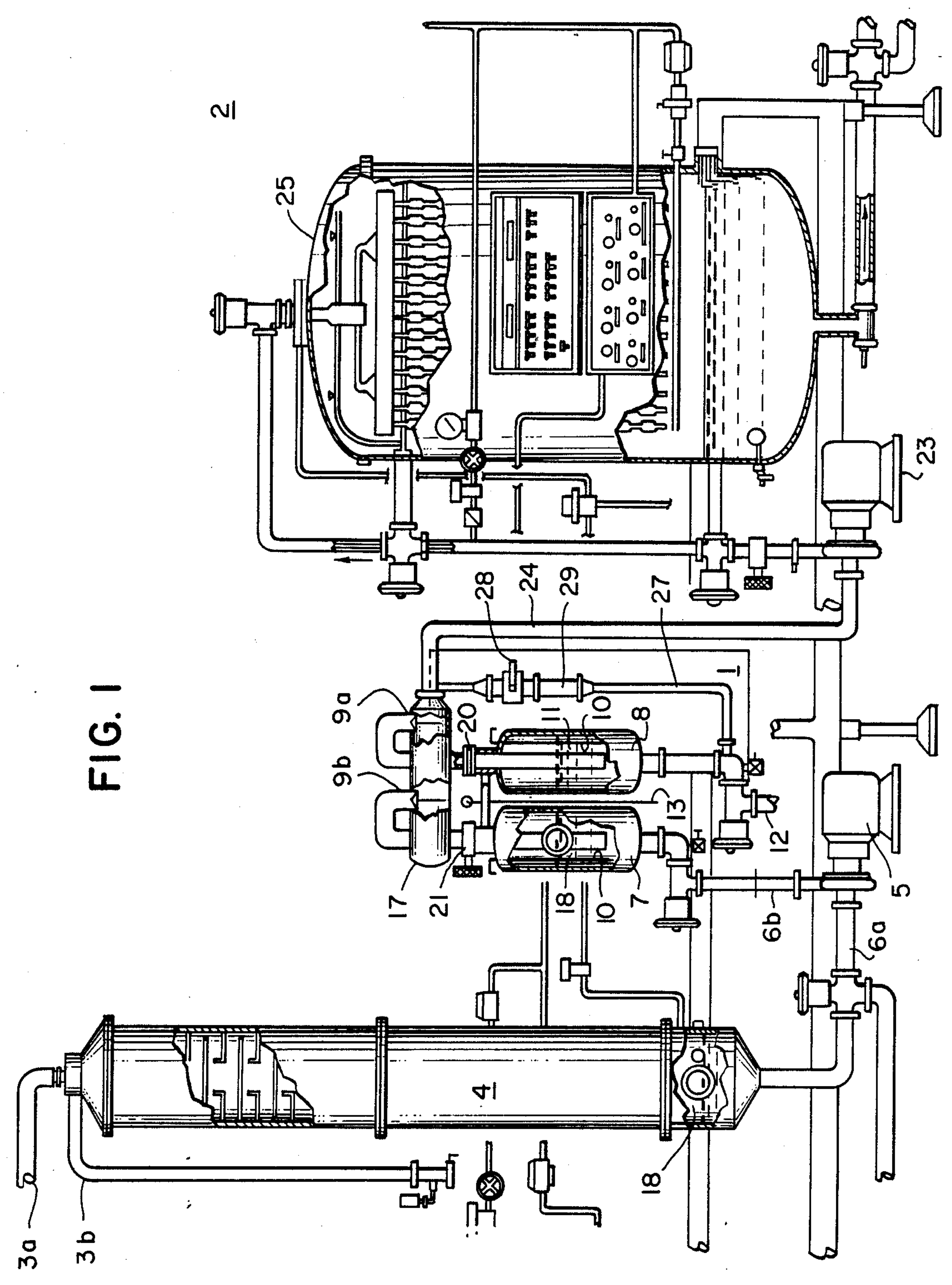
FIG. 1 is a rear view of a mixing/cooling/carbonation system including the novel syrup recovery system of the present invention and including a fragmentary view of the syrup and water reservoirs and the mixing manifold.

FIG. 1 shows the preferred embodiment of a syrup recovery system 1 as it is incorporated into a conventional mixing/cooling/carbonation/bottling ("MCCB") system 2. Said MCCB system 2 of FIG. 1 will be described in sufficient detail to disclose the role which said syrup recovery system 1 of the present invention plays in its overall operation cycle.

In the operation of said MCCB system 2, water 18 is initially supplied by lines *3a* and *3b* to a precooler/deaerating vessel 4. A water pump 5 operating through lines *6a* and *6b* transfers said water 18 from said precooler/deaerating vessel 4 to a water reservoir 7, which is part of a proportioning apparatus which also includes a syrup reservoir 8 similar in design and operation to said water reservoir 7. Both said water reservoir 7 and said syrup reservoir 8 are provided with liquid level controls comprising a syrup plunger *9a* and a water plunger *9b* and liquid level detectors 10. In order to permit direct observation, said syrup reservoir 8 and said water reservoir 7 are also equipped, respectively, with a syrup level sighting window *8a* and a water level sighting window *7a*.

During normal production runs of said MCCB system 2, a syrup 11 is introduced to said syrup reservoir 8 through a syrup fill line 12. Said water reservoir 7 and said syrup reservoir 8 are both pressurized by carbon dioxide gas introduced by means of a pressurization line 13 into a syrup head space 14 and a water head space 15, respectively, so that said syrup 11 is forced up through a vertical immersed syrup conduit 16 into a mixing manifold 17 and so that said water 18 is forced up through a vertical immersed water conduit 19 into said mixing manifold 17. Said syrup 11 is combined with said water 18 in a predetermined ratio achieved by the relative cross-sectional areas of a syrup orifice fixture 20 and a water orifice fixture 21, respectively. A mixture 22 results. A transfer pump 23 operating through a transfer line 24 transfers said mixture 22 into a carbonator vessel 25. While said MCCB system 2 is being run in its automatic mode, said transfer pump 23 runs if and only if said syrup 11 and said water 18 are maintained within the operating levels dictated by said level detectors 10. This is also true of said pressurization line 13. (Clearly, if said syrup head space 14 or said water head space 15 continued to be pressurized when either said syrup 11 or said water 18 fell below the bottom of said immersed syrup conduit 16 or said immersed water conduit 19, the pressurizing gas rather than a fluid would pass through one or the other of said immersed syrup conduit 16 or said immersed water conduit 19 into said mixing manifold 17, with deleterious results in said mixture 22. The result would be improper fluid mixtures in said carbonator vessel 25 and an unusable product.) The resulting carbonated beverage is then bottled through means not depicted in the Figures.

Figure 2:
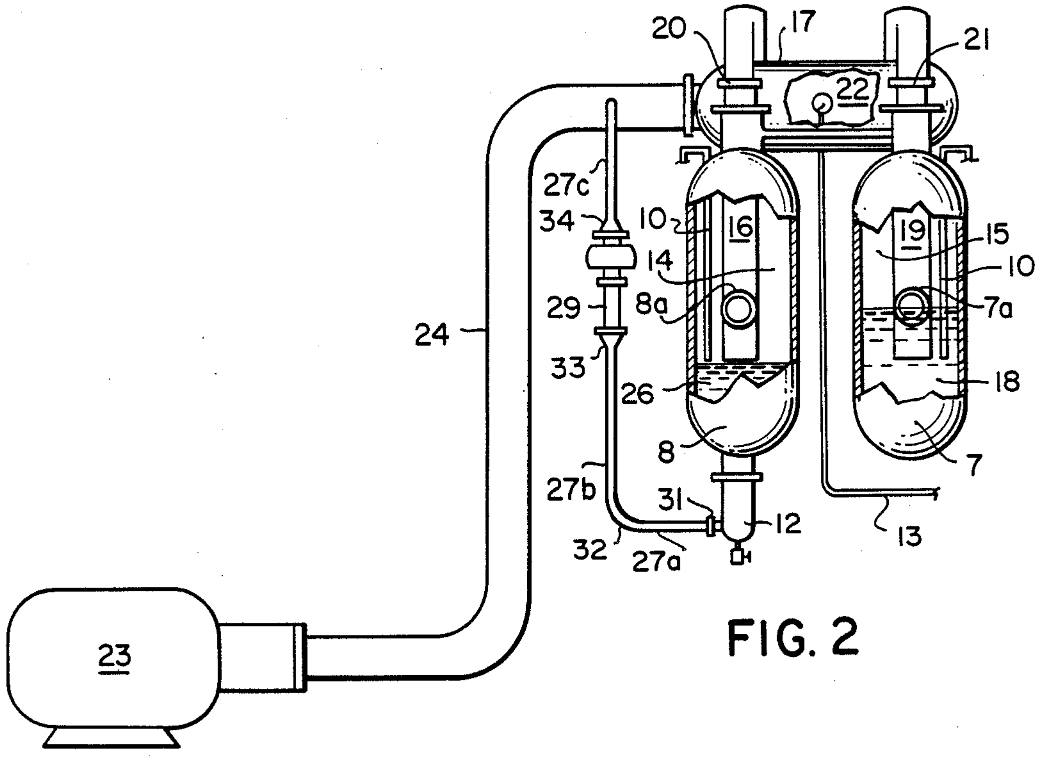
FIG. 2 is a front view of a section of the mixing-/cooling/carbonation system of FIG. 1 and the location of the novel syrup recovery system of the present invention, including a fragmentary view of the syrup and water reservoirs and the mixing manifold.

At the conclusion of a particular production run, there will be a syrup residue 26 remaining in the lower section of said reservoir 8. The present invention is directed toward the utilization of said syrup residue 26 remaining in said MCCB system 2. FIG. 2 illustrates in some detail the preferred embodiment of the present invention. It comprises a residue transfer tube 27, which is connected to the bottom-most point of said syrup reservoir 8 in such a way that said residue transfer tube 27 always communicates with said syrup 11 contained within said syrup reservoir 8. Said residue transfer tube 27 incorporates a residue shutoff valve 28 capable of sealing off said residue transfer tube 27. When said syrup 11 is being introduced to said syrup reservoir 8 at the beginning of a production run, said residue shutoff valve 28 is initially left open so that said syrup 11 flowing into said syrup reservoir 8 also flows up said residue transfer tube 27, as can be confirmed by looking through a residue sight glass 29 consisting of a transparent section of tubing. Prior to the pressurization of said syrup reservoir 8 and said water reservoir 7, said residue shutoff valve 28 is closed, preventing further flow of said syrup 11 up said residue transfer tube 27.

Figure 3:
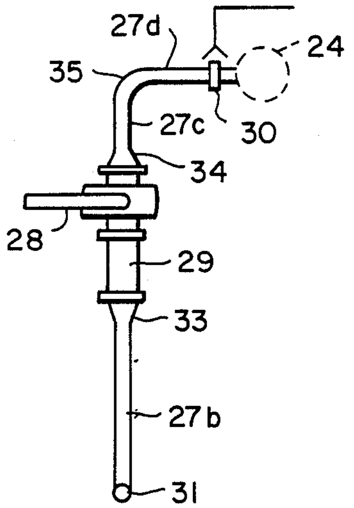
FIG. 3 is a detailed side view of the syrup recovery system.
Figure 4:
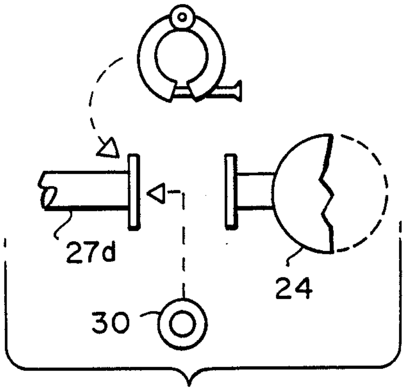
FIG. 4 is a detailed view of a recovery orifice, located in a residue transfer tube of the novel syrup recovery system.

With reference FIGS. 2–4, said residue transfer tube 27 of the preferred embodiment of the present invention can be seen to comprise the following components and interconnections: (a) a bottom horizontal section *27a* of length approximately 12" and 1½" inner diameter, extending horizontally from said syrup fill line 12 to which it is connected through a transfer tube orifice fixture 31; (b) a first 90-degree elbow 32 which links said bottom horizontal section *27a* to a lower vertical section *27b*, which has an inner diameter of 1½" and a length of approximately 26 inches and is oriented parallel to the vertical axis of said syrup reservoir 8; (c) a first tapered section 33 which has an inner diameter at its lower end of 1½" and an inner diameter at its upper end of 2" and which links said lower vertical section *27b* to said residue sight glass 29; (d) said residue sight glass 29 located at the same vertical elevation as said level-sighting windows *7a* and *8a*; said residue shutoff valve 28 positioned immediately above said residue sight glass 29; (e) a second tapered section 34 which has an inner diameter at its lower end of 2" and an inner diameter at its upper end of 1½" and which links said residue shutoff valve 28 with an upper vertical section 27c which is about 6" in length; (f) a second 90-degree elbow 35 linking said upper vertical section 27c to an upper horizontal section 27d which is about 8" in length and which provides the link between said residue transfer tube 27 and said transfer line 24 through (g) a recovery orifice fixture 30, which is sized to provide mixing of said syrup residue 26 and said water 18 in predetermined proportions, typically one part of syrup to five parts water by volume. Said recovery orifice fixture 30 has an inner diameter of approximately 1". In summary, said residue transfer tube 27 has an inner diameter of 1½" throughout most of its length, increasing to an inner diameter of 2" to accommodate said residue shutoff valve 28 and said residue sight glass 29.

At the conclusion of a conventional production run, said syrup 11 will fill said syrup reservoir 8 only to the bottom of said immersed syrup conduit 16. At this point the automatic circuitry of said MCCB system 2 will (a) cause said transfer pump 23 to shut off and (b) cause said syrup plunger 9a and said water plunger 9b to close, thus interrupting the flow of said syrup 11 and water 18 into said mixing manifold 17. The preferred embodiment of the present invention comprises an electronic override means designed to allow said transfer pump 23 to be operated and said pneumatic plungers 9a and 9b to be opened even when said syrup 11 falls below the level preset by said liquid level detectors 10, namely below the bottom of said immersed syrup conduit 16. During recovery of said syrup residue 26, said override means is activated to permit manual operation of said transfer pump 23. It also reopens said syrup plunger 9a and said water plunger 9b, so that said syrup residue 26 remaining in said syrup reservoir 8 is forced through said transfer tube orifice fixture 31 into said residue transfer tube 27 and said water 18 forced through said immersed water conduit 19 into said mixing manifold 17.

Prior to the manual activation of said transfer pump 23 said syrup residue shutoff valve 28 is opened. Then said transfer pump 23 is activated by automatic circuitry which also reopens said syrup plunger 9a and said water plunger 9b. Several things happen at this point. First of all said water 18 is forced up said immersed water conduit 19 and into said mixing manifold 17 just as before. Under the recovery mode of operation, however, there is no other fluid present in said mixing manifold 17 to mix with said water 18. Said water 18 simply passes through said mixing manifold 17 and into said transfer line 24, subject in part to the forces introduced by said transfer pump 23. Concurrent with this, said syrup residue 26 is forced by the pressurization of said syrup head space 14 to travel through said residue transfer tube 27 and then through said recovery orifice fixture 30 into said transfer line 24, where it combines and mixes with said water 18. The rate at which said syrup residue 26 is introduced into said transfer line 24 during this process is determined in major part by the size of said recovery orifice fixture 30, the pressurization in said syrup head space 14 and the venturi forces created by said water 18 as it flows in said transfer line 24 past the opening of said recovery orifice fixture 30. The headspace pressurization remains the same for said water 18 but is reduced for said syrup headspace 14 because said syrup plunger 9a in said immersed conduit 16 above said syrup residue 26 remains open throughout the recovery process, thus allowing carbon dioxide to escape through said immersed syrup conduit 26 into said mixing manifold 17. Since this pressurization determines the flow rate of said water 18 past said recovery orifice fixture 30, and the flow of water into said residue transfer tube 27, the major variable is the area of said recovery orifice fixture 30. The area is chosen so as to ensure that the mixing ratio by which said water 18 and said syrup residue 26 combine during the recovery phase is the same as that established during the main production run. This permits the utilization of said syrup residue 26 in the remainder of the carbonation and bottling process. Although said mixing manifold 17 is bypassed as far as mixing is concerned, said water 18 and said syrup residue 26 are sufficiently mixed in said transfer line 24.

As the recovery phase draws to a close, the gas used to pressurize said syrup head space 14 can be observed bubbling up past said residue sight glass 29. At this point said residue shutoff valve 28 is manually closed off and said transfer pump 23 is manually shut down. This results in the simultaneous closing of said plungers 9a and 9b, and the termination of said water 18 flowing into said syrup residue 26 into said syrup residue tube 27. At that point, with the preferred embodiment of the invention, approximately one pint of unused syrup is left in said MCCB system 2; i.e., approximately 95% of said syrup residue 26 remaining at the end of the normal production run has been recovered and utilized.

The recovery of approximately five gallons of syrup for each syrup run, totaling approximately 25 gallons recovered per day, reduces the BOD output levels of a beverage processing plant significantly. At one plant in particular the average BOD level for three sets of composite sampling, each taken over a 24 hour period, as measured from the plant effluent stream was significantly reduced following the introduction of the preferred embodiment of the present invention. Prior to its introduction, the average BOD level monitored at the bottling plant outfall was 1110 milligrams per liter (mg/l). The maximum allowable level for that plant—that is, the threshold level at which sewerage surcharges are triggered—as determined by the local municipality, was 250 mg/l. After the introduction of the syrup recovery system to the plant's mixing and bottling unit, the average BOD level at the plant outfall was down to 286 mg/l, significantly reducing the sewerage surcharges to be paid.

Although there are a number of contributors to the BOD of this plant's sewage outfall, it is clear from these figures that the BOD added by the previously-dumped syrup residue was significantly more than all of the contributions combined. Thus the introduction of the preferred embodiment of the present invention to processing units in use throughout the bottling industry will eliminate the problem of wasted product and hight BOD output levels which plague a typical beverage processing plant. In its preferred embodiment the syrup recovery system comprising the present invention can be easily affixed to those processing units which need them, i.e. those units comprising a proportioning apparatus which places the mixing manifold above the fluid reservoirs.

Although the best mode contemplated for realizing and implementing the present invention has been shown and described herein, it will be apparent that modifications and variations of said mode may be made without departing from what is regarded to be the subject matter of the present invention.

I claim:

1. A method for proportionately combining water and a syrup in an automated large-scale bottling system, comprising process (a) and improvement process (b) wherein said process (a) includes the steps of:

a. transferring said syrup from a syrup reservoir and said water from a water reservoir adjacent to said syrup reservoir into a mixing manifold located directly above said syrup reservoir and said water reservoir, utilizing i. an immersed syrup conduit extending downward from said mixing manifold into, but not to the bottom of, said syrup reservoir and an immersed water conduit extending downward from said mixing manifold into, but not to the bottom of, said water reservoir, ii. a controllable pressurization of said syrup reservoir and said water reservoir wherein said pressurization forces said syrup up through said immersed syrup conduit into said mixing manifold and also forces said water up through said immersed water conduit into said mixing manifold, b. mixing said water and said syrup in said mixing manifold to produce a mixture of said syrup and said water in a ratio determined by the size of a syrup orifice fixture in proportion to the size of a water orifice fixture, wherein i. said syrup orifice fixture connects said mixing manifold and said immersed syrup conduit, ii. said water orifice fixture connects said mixing manifold and said immersed water conduit, c. pumping said mixture with a transfer pump through a transfer line to a carbonation vessel, and d. stopping said process (a) by automatic termination when said syrup in said syrup reservoir falls to the bottom of said immersed syrup wherein a syrup plunger in said immersed syrup conduit and a water plunger in said immersed water conduit are closed simultaneously, leaving a syrup residue in said syrup reservoir, wherein said improvement process (b) comprises the steps of a. reopening said water plunger in said immersed conduit to force said water up into said mixing manifold utilizing said controllable pressurization of said water reservoir, b. creating a venturi effect at a recovery orifice fixture by pumping said water from said mixing manifold through said transfer line past said recovery orifice fixture, wherein said recovery orifice fixture connects a residue transfer tube with said transfer line, c. reopening said syrup plunger to force said syrup residue out of said syrup reservoir and up into said transfer line utilizing i. said residue transfer tube, one end of said residue transfer tube comprising said recovery orifice fixture and the other end comprising a transfer tube orifice fixture, wherein said transfer tube orifice fixture opens into a syrup inlet line underneath said residue in said syrup reservior, ii. said controllable pressurization of said syrup reservoir, d. mixing said syrup residue flowing into said transfer line with said water flowing past said recovery orifice fixture so as to form a residue mixture, e. sizing said recovery orifice so as to ensure that said residue mixture contains said syrup residue and said water in a predetermined proportion, f. pumping said residue mixture to said carbonation vessel.

2. A method as claimed in claim 1 in which said improvement process (b) further comprises bypassing said automatic termination of said process (a) so that:

a. said reopening of said water plunger and said reopening of said syrup plunger of said improvement process (b) are achieved by utilizing electronic override means, and b. said venturi effect of said process (b) is created utilizing said transfer pump of said process (a).

3. Apparatus for proportionately combining water and a syrup in an automated bottling system, comprising a mixing/cooling/carbonation/bottling ("MCCB") apparatus and an improvement apparatus, wherein said MCCB apparatus comprises:

a. a syrup reservoir containing said syrup, b. a water reservoir containing said water, wherein said water reservoir is positioned adjacent to said syrup reservoir, c. a mixing manifold in which to mix said syrup and said water, wherein said mixing manifold is positioned above both said water reservoir and said syrup reservoir, d. means of transferring said syrup from said syrup reservoir and said water from said water reservoir into said mixing manifold, utilizing i. an immersed syrup conduit extending downward from said mixing manifold into, but not to the bottom of, said syrup reservoir and an immersed water conduit extending downward from said mixing manifold into, but not to the bottom of, said water reservoir, ii. a controllable pressurization of said syrup reservoir and of said water reservoir wherein said pressurization forces said syrup up through said immersed syrup conduit into said mixing manifold and also forces said water up through said immersed water conduit into said mixing manifold, e. means of mixing said water and said syrup in said mxing manifold to produce a mixture of said syrup and said water in a ratio determined jointly by the size of a syrup orifice fixture and a water orifice fixture, wherein i. said syrup orifice fixture connects said mixing manifold and said immersed syrup conduit, and ii. said water orifice fixture connects said mixing manifold and said immersed water conduit, f. a transfer pump to pump said mixture from said mixing manifold through a transfer line to a carbonation vessel, and g. automatic circuitry to close a syrup plunger in said immersed syrup conduit and a water plunger in said immersed water conduit and to terminate operation of said transfer pump wherever said syrup in said syrup reservoir falls to the bottom of said immersed syrup conduit, thereby leaving a syrup residue in said syrup reservoir, said improvement apparatus comprising a. means of reopening said water plunger in said immersed water conduit so as to utilize said controllable pressurization of said MCCB apparatus to provide sufficient force on said water so that said water again moves up through said immersed water conduit and into said mixing manifold, b. means of drawing said water from said mixing manifold through said transfer line past a recovery orifice fixture so as to create a venturi effect at said recovery orifice fixture, c. a residue transfer tube to transfer said syrup residue from said syrup reservoir to said transfer line, one end of said residue transfer tube comprising said recovery orifice fixture and the other end of said recovery transfer tube comprising a transfer tube orifice fixture, wherein said transfer tube orifice fixture opens into a syrup inlet line, and wherein said syrup inlet line is positioned underneath said syrup residue in said syrup reservoir, d. means of reopening said syrup plunger in said immersed syrup conduit so as to utilize said controllable pressurization of said MCCB apparatus to provide sufficient force on said syrup residue to force said syrup residue out through said transfer tube orifice fixture, through said residue transfer tube, into said water in said transfer line flowing past said recovery orifice fixture so as to form a residue mixture, wherein said recovery orifice fixture is sized to ensure that said residue mixture contains said syrup residue and said water in a predetermined proportion, and e. means of pumping said residue mixture to said carbonation vessel.

4. The improvement apparatus of claim 3 further comprising means of terminating the flow of syrup residue through said residue transfer tube.

5. The improvement apparatus of claim 4 wherein said means of terminating the flow of syrup residue through said residue transfer tube is a residue shutoff valve.

6. The improvement apparatus of claim 3 further comprising a means of observing the flow of syrup residue through said residue transfer tube.

7. The improvement apparatus of claim 6 wherein said means of observing the flow of syrup residue through said residue transfer tube is a residue sight glass.

8. The improvement apparatus of claim 3 wherein said means of reopening said water plunger in said immersed water conduit and said means of reopening said syrup plunger in said immersed syrup conduit are electronic overrides, wherein said electronic overrides bypass said automatic circuitry of said MCCB apparatus.

9. The improvement apparatus of claim 8 wherein said electronic overrides bypass said automatic circuitry of said MCCB apparatus so as to utilize said transfer pump of said MCCB apparatus to create said venturi effect.

10. Apparatus for proportionately combining water and a syrup in an automated bottling system, comprising a mixing/cooling/carbonation/bottling ("MCCB") apparatus and an improvement apparatus, wherein said MCCB apparatus comprises:

a. a syrup reservoir said syrup, b. a water reservoir containing said water, wherein said water reservoir is positioned adjacent to said syrup reservoir, c. a mixing manifold in which to mix said syrup and said water, wherein said mixing manifold is positioned above both said water reservoir and said syrup reservoir, d. means of transferring said syrup from a syrup reservoir and said water from said water reservoir into said mixing manifold utilizing i. an immersed syrup conduit extending downward from said mixing manifold into, but not to the bottom of, said syrup reservoir and an immersed water conduit extending downward from said mixing manifold into, but not to the bottom of, said water reservoir, ii. a controllable pressurization of said syrup reservoir and of said water reservoir wherein said pressurization forces said syrup up through said immersed syrup conduit into said mixing manifold and also forces said water up through said immersed water conduit into said mixing manifold, e. means of mixing said water and said syrup in said mixing manifold to produce a mixture of said syrup and said water in a ratio determined jointly by the size of a syrup orifice fixture and a water orifice fixture, wherein i. said syrup orifice fixture connects said mixing manifold and said immersed syrup conduit, and ii. said water orifice fixture connects said mixing manifold and said immersed water conduit, f. a transfer pump to pump said mixture from said mixing manifold through a transfer line to a carbonation vessel, and g. automatic circuitry to close a syrup plunger in said immersed syrup conduit and a water plunger in said immersed water conduit and to terminate operation of said transfer pump whenever said syrup in said syrup reservoir falls to the bottom of said immersed syrup conduit, thereby leaving a syrup residue in said syrup reservoir, said improvement apparatus comprising:

a. electronic override means to bypass said automatic circuitry of said MCCB apparatus to:

i. reopen said water plunger in said immersed water conduit so as to utilize said controllable pressurization of said MCCB apparatus to provide sufficient force on said water so that said water again moves up through said immersed water conduit and into said mixing manifold, ii. reopen said syrup plunger in said immersed syrup conduit so as to utilize said controllable pressurization of said MCCB apparatus to force said syrup residue out through a transfer tube orifice fixture, iii. utilize said transfer pump so as to create a venturi effect at a recovery orifice fixture by drawing said water with said transfer pump through said transfer line and past said recovery orifice fixture, b. a residue transfer tube to transfer said syrup residue from said syrup reservoir to said transfer line, said residue transfer tube comprising i. said recovery orifice fixture at one end, and at the other end ii. said residue transfer tube comprising said transfer tube orifice fixture, wherein said transfer tube orifice fixture opens into a syrup inlet line, and wherein said syrup inlet line is positioned underneath said syrup residue in said syrup reservoir, c. means of forming a residue mixture by forcing said syrup residue through said transfer tube to said transfer line and utilizing said venturi effect to draw said syrup residue through said recovery orifice fixture and into said water flowing past said recovery orifice fixture so as to mix said syrup residue and said water in said transfer line, wherein said recovery orifice fixture is sized to ensure that said residue mixture contains said syrup residue and said water in a predetermined proportion, d. transfer of said residue mixture to said carbonation vessel utilizing said transfer pump, e. a residue sight glass to observe said syrup residue flowing through said residue transfer tube, and f. a residue shutoff valve to terminate the flow of said syrup residue through said residue transfer tube whenever an inert gas of said controllable pressurization of said syrup residue is observed bubbling up in said residue sight glass.

* * * * *